United States Patent
Bellenfant et al.

(10) Patent No.: US 9,255,740 B2
(45) Date of Patent: Feb. 9, 2016

(54) HEAT EXCHANGER WITH HEAT ACCUMULATOR

(75) Inventors: Aurelie Bellenfant, Roeze sur Sarthe (FR); Sylvain Moreau, Spay (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 991 days.

(21) Appl. No.: 12/685,829

(22) Filed: Jan. 12, 2010

(65) Prior Publication Data

US 2010/0175849 A1    Jul. 15, 2010

(30) Foreign Application Priority Data

Jan. 12, 2009 (FR) ...................................... 09 00105

(51) Int. Cl.
| | |
|---|---|
| *F28D 17/00* | (2006.01) |
| *F28D 1/03* | (2006.01) |
| *B60H 1/00* | (2006.01) |
| *F28D 20/00* | (2006.01) |

(52) U.S. Cl.
CPC .............. *F28D 1/0308* (2013.01); *B60H 1/005* (2013.01); *B60H 1/00328* (2013.01); *F28D 2020/0013* (2013.01)

(58) Field of Classification Search
CPC ................ Y02E 60/145; Y02E 60/142; F28D 2020/008; F28D 2020/0013; F28D 2020/0078; F28D 2020/0082; F28D 2020/0086; F28D 20/021; F28D 20/026; F28D 2021/0096; B60H 1/00492; B60H 1/005; F25D 3/005
USPC ........... 165/10, 42, 104.19, 104.28, 144, 151, 165/152, 153, 154, 164, 167, 173, 174, 177, 165/149, 175; 62/430, 431, 439, 437, 438; 29/890.036, 890.038, 890.04, 890.049, 29/890.05, 890.039
See application file for complete search history.

(56) References Cited

U.S. PATENT DOCUMENTS

| | | | | |
|---|---|---|---|---|
| 2,151,540 | A * | 3/1939 | Varga | 138/117 |
| 4,250,958 | A * | 2/1981 | Wasserman | 165/46 |
| 4,709,752 | A * | 12/1987 | Schroder et al. | 165/47 |
| 5,388,329 | A * | 2/1995 | Randlett et al. | 29/890.049 |
| 6,405,793 | B1 * | 6/2002 | Ghodbane et al. | 165/203 |
| 7,073,570 | B2 * | 7/2006 | Yu et al. | 165/140 |
| 7,156,156 | B2 * | 1/2007 | Haller et al. | 165/10 |
| 8,025,240 | B2 * | 9/2011 | Keller | 237/69 |

(Continued)

FOREIGN PATENT DOCUMENTS

| | | |
|---|---|---|
| DE | 102004035818 A1 | 3/2006 |
| EP | 1733906 A2 | 12/2006 |

(Continued)

OTHER PUBLICATIONS

English language abstract for DE102004035818 extracted from espacenet.com database, dated Mar. 29, 2010, 17 pages.

(Continued)

*Primary Examiner* — Travis Ruby
(74) *Attorney, Agent, or Firm* — Howard & Howard Attorneys PLLC

(57) ABSTRACT

A plate (20) for a heat transfer tube (4) made from a metal sheet includes a peripheral outer wall (10) and having at least one first cavity (24) and least one second cavity (26) respectively formed in the metal sheet. The first cavity (24) is in contact with the peripheral outer wall (10) and the second cavity (26) is arranged at a distance from the outer wall (10). A heat transfer tube (4) of a heat exchanger (1) includes a pair of such plates (20) and a heat exchanger (1) includes a plurality of such tubes (4).

23 Claims, 3 Drawing Sheets

(56) References Cited

U.S. PATENT DOCUMENTS

| | | |
|---|---|---|
| 8,495,894 B2 * 7/2013 | Kerler et al. | 62/406 |
| 2002/0002837 A1 * 1/2002 | Shirota et al. | 62/430 |
| 2004/0244196 A1 * 12/2004 | Kaimura et al. | 29/890.052 |
| 2006/0283585 A1 * 12/2006 | Smith et al. | 165/177 |
| 2009/0260586 A1 * 10/2009 | Geskes et al. | 123/41.48 |

FOREIGN PATENT DOCUMENTS

| | | | |
|---|---|---|---|
| FR | 2878613 | A1 | 6/2006 |
| FR | 2878614 | A1 | 6/2006 |

OTHER PUBLICATIONS

English language abstract for EP 1733906 extracted from espacenet.com database, dated Mar. 29, 2010, 18 pages.

English language abstract for FR 2878613 extracted from espacenet.com database, dated Mar. 29, 2010, 27 pages.

English language abstract for FR 2878614 extracted from espacenet.com database, dated Mar. 29, 2010, 43 pages.

INPI Institut National De La Propriete Industrielle search report for FA717210/FR0900105, dated May 8, 2009, 1 page.

* cited by examiner

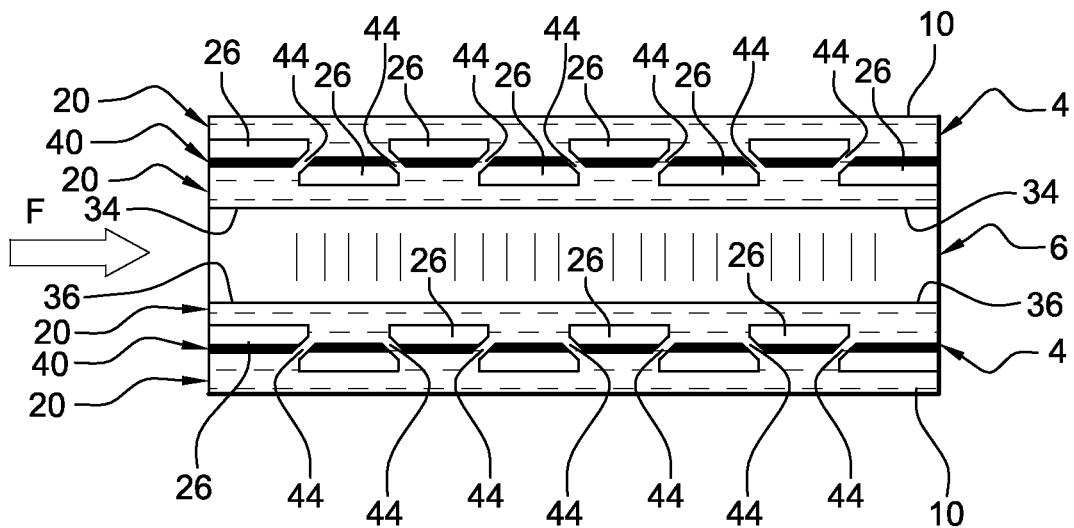
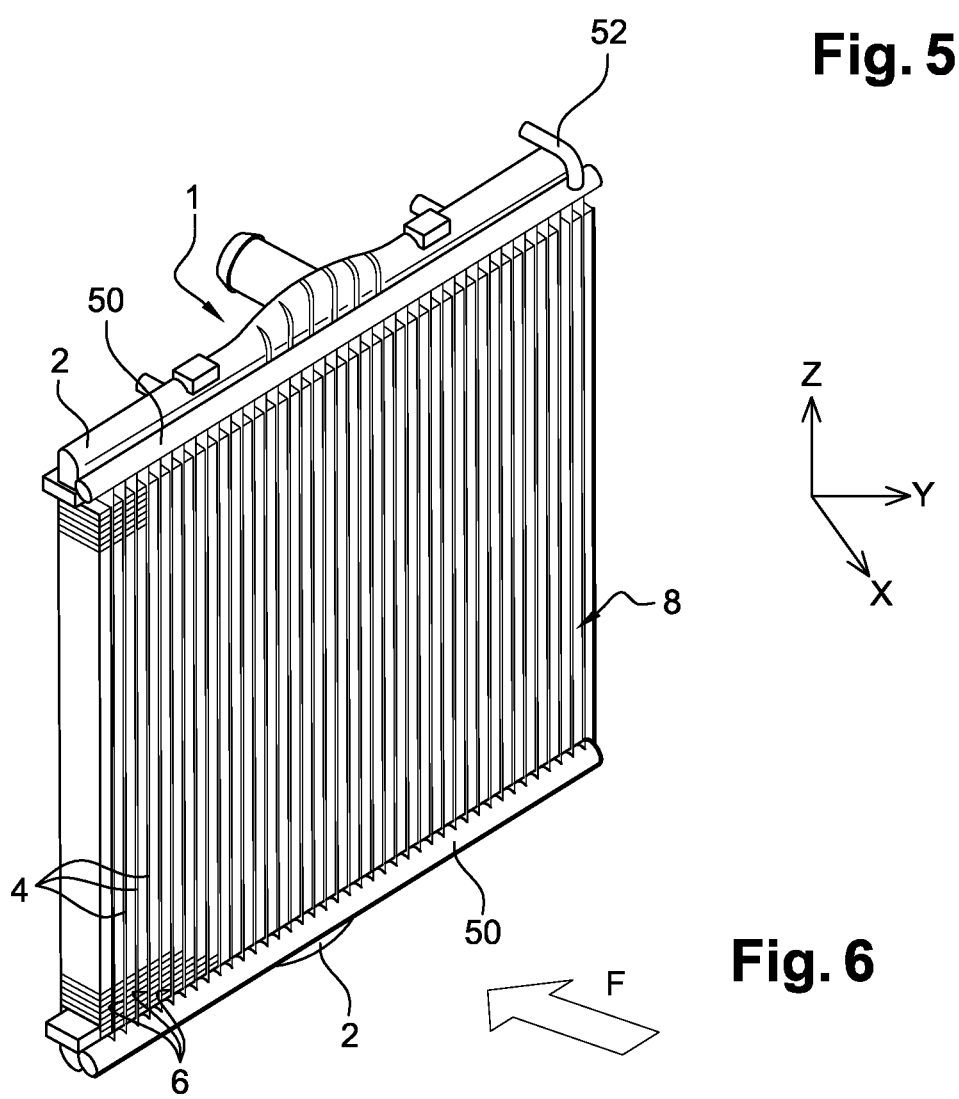
Fig. 5
Fig. 6

HEAT EXCHANGER WITH HEAT ACCUMULATOR

RELATED APPLICATIONS

This application claims priority to and all the advantages of French Patent Application No. FR 09/00105, filed on Jan. 12, 2009.

BACKGROUND OF THE INVENTION

This invention relates to a heat exchanger, and more specifically to a heat exchanger including a core of tubes for circulation of a heat transfer fluid, inserted in an assembly of aligned heat exchange inserts and a core of thermal storage material tanks inserted in the assembly of heat exchange inserts.

A heat exchanger commonly includes one or more rows of aligned tubes in which a heat transfer fluid circulates. The assembly of these tubes is generally designed referred to as a core. Such a heat exchanger is intended to enable a heat exchange between the heat transfer fluid circulating in the tubes and a fluid externally passing through the heat exchange device.

To improve this heat exchange, heat exchange inserts are arranged between the tubes and intended to increase the surface available for the heat exchange, and to disrupt the external fluid flow so as to enhance the performance of the heat exchanger.

Such a heat exchanger can, for example, be integrated in an air conditioning system of a motor vehicle. In this case, the external fluid passing through the device is generally air intended to be blown into the vehicle interior, and the heat transfer fluid is a coolant. The heat exchange is intended in this case to refresh the blowing air.

The circulation of fluid, inside the air conditioning system, is ensured by a compressor, generally powered directly by the engine of the motor vehicle.

Consequently, when the engine of the vehicle is stopped, the circulation of the fluid ceases, and the heat exchange between the air and the heat transfer fluid cannot take place. The Air blown into the vehicle interior is then no longer being refreshed. This situation is all the more problematic as recent systems, designed to reduce the fuel consumption of motor vehicles, automatically stop the engine when the vehicle is not moving. The vehicle interior is thus deprived of refreshed air.

It is known to combine, with a heat exchanger, thermal storage material tanks, in which the material stores heat or cold when the heat transfer fluid is circulating in the system, and restores them to the external fluid when the heat transfer fluid is no longer circulating. In the particular case described above, of an air conditioning system, it is known to provide the heat exchanger with cold storage material tanks, capable of storing cold when the engine is running and restoring it when the engine is stopped, but for the air to continue to be blown into the vehicle interior. Such heat exchangers are known in particular from documents FR 2 878 613 and FR 2 878 614.

However, these heat exchangers are not suitable for fluids circulating in tubes under high pressure, such as, for example, the working pressure of carbon dioxide.

One of the objectives of the invention is therefore to overcome the aforementioned disadvantages.

BRIEF SUMMARY OF THE INVENTION

To this end, the invention proposes a new type of tube wall member for a heat exchanger, made of a sheet metal plate defining an external peripheral wall and comprising at least one first cavity and at least one second cavity, respectively formed in the sheet metal plate, in which the first cavity is in contact with the external peripheral wall and the second cavity is arranged at a distance from the external peripheral wall.

In one particular embodiment, the second cavity is connected to the external peripheral wall by a joining wall.

In a complementary manner, the second cavity has a substantially semi-cylindrical shape.

In another embodiment, the wall member comprises, according to a first direction of extension, a plurality of first cavities and a plurality of second cavities, and, more specifically, the first cavities are arranged alternately with the second cavities according to the first direction of extension.

This invention also relates to a tube consisting of a first wall member and a second wall member, arranged in particular with mirror symmetry or central symmetry.

According to an alternative embodiment, the first cavity of the first wall member cooperates with the first cavity of the second wall member in order to define a first fluid circulation channel.

Complementarily, the second cavity of the first wall member cooperates with the second cavity of the second wall member in order to define a second fluid circulation channel.

Preferably, an intermediate communication plate is arranged between the first and second wall members.

In this case, the first cavity of the first wall member and/or the second wall member cooperates with the intermediate communication plate in order to define a first fluid circulation channel.

Similarly, the second cavity of the first wall member and/or the second wall member cooperates with the intermediate communication plate in order to define a second fluid circulation channel.

According to an alternative, the intermediate communication plate comprises at least one passage enabling communication between at least two first cavities and/or at least two second cavities.

Finally, this invention also relates to a heat exchanger including a plurality of such tubes.

A heat exchanger consists of a core comprising a plurality of heat exchange inserts alternating with the plurality of tubes.

Advantageously, the first cavities of the tubes are tanks for a thermal storage material and the second cavities of the tubes are channels for circulation of a heat transfer fluid.

In all of the embodiments, at least some of the heat exchange inserts advantageously include a second contact face with each tube. In this case, most of the tubes are in contact with two inserts, enhancing the performance of the various heat exchanges.

Preferably, the thermal storage material tanks have a tubular appearance, and, in particular, the tanks are produces as flat tubes. In this configuration, the tanks are simple to produce.

In a preferred embodiment, the heat transfer fluid is a coolant and the thermal storage material is a material for storing cold. This configuration is particularly suitable for an air conditioning system, for example for the interior of a motor vehicle.

BRIEF DESCRIPTION OF THE DRAWINGS

Other features and advantages of the invention will become clear in the following detailed description and the appended drawings, which may be used for better comprehension of the invention, but also, as the case may be, contribute to the definition of the invention, wherein:

FIG. 5 is a top cross-section view according to the V-V direction of the heat exchanger according to this invention, and FIG. 6 is a perspective view of a heat exchanger according to another embodiment of this invention.

DETAILED DESCRIPTION

Figure 1:
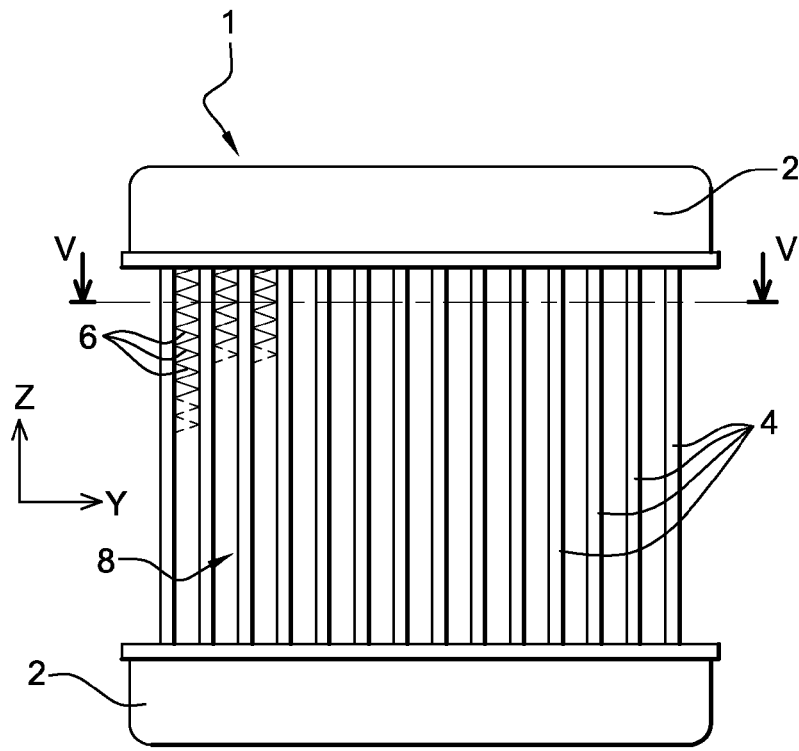
FIG. 1 is a diagrammatic front view of a heat exchanger according to this invention including a plurality of heat exchange inserts and associated heat transfer fluid circulation tubes.

FIG. 1 diagrammatically and shows, in a front view, a heat exchanger 1 belonging to a heat exchange device according to the invention. The heat exchanger 1 includes two juxtaposed collection tanks 2. According to a specific embodiment, the two collection tanks 2 have a parallelepiped shape. The collection tanks 2 can have any other geometric shape.

The heat exchanger 1 also includes a core 8 of tubes 4 aligned in one or more rows. Each of the tubes 4 is received at one and the other of its ends by one of the collection tanks 2. Between two adjacent tubes 4 of the same row of tubes, a heat exchange insert 6 is provided.

The core 8 extends over a thickness in a direction X, defining a first direction of extension, over a width of the core in a direction Y, which is perpendicular to the direction X and defining a second direction of extension, and over a height in a direction Z, and which is perpendicular to both directions Y and Z and defining a third direction of extension. The directions X, Y and Z form an orthonormal reference.

The heat exchange insert 6 is, for example, an insert with an undulated shape made of a strip of sheet metal bent successively so as to form a series of substantially planar portions connected two-by-two by bent portions. The apexes of the bent portions define a first and a second plane, parallel to one another, respectively defining a first contact face 34 and a second contact face 36. The entirety of a heat exchange insert 6 is thus contained between these first and second planes.

The bent portions of the heat exchange insert 6 come into contact with the external peripheral wall 10 of the tubes 4 so as to perform a heat exchange function.

In general, the tubes 4 are each in contact with two inserts arranged on either side of the tube 4. In particular, each tube 4 has two large lateral faces parallel to one another and consisting of a planar sections 30 of each wall member 20 forming the tube 4. One of the large faces of the tube 4 is in contact over its entire span with the first contact face 34 of the insert. The other large face is in contact with the second contact face 36 of an adjacent insert.

Figure 2:
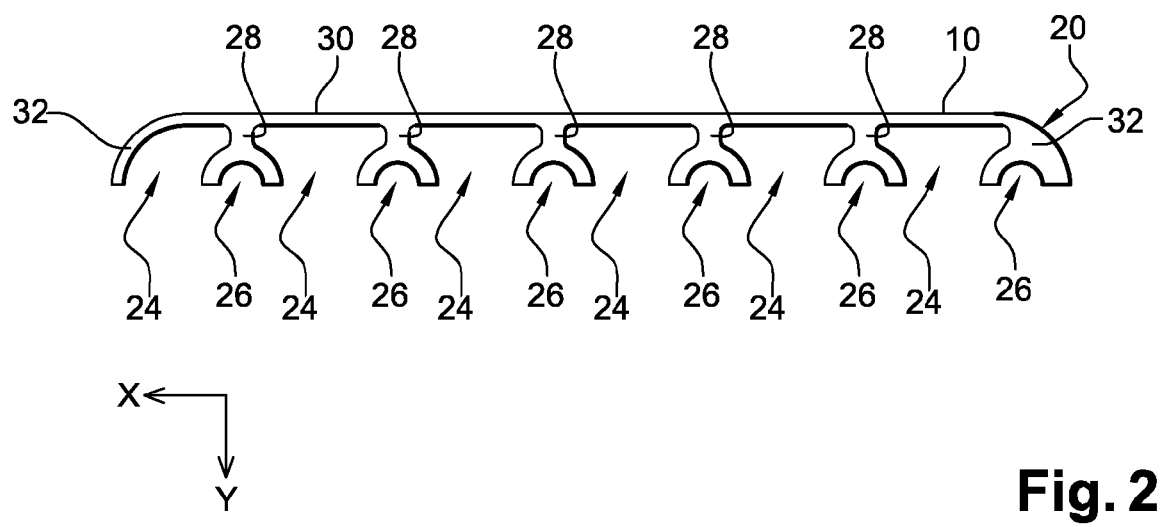
FIG. 2 is a front cross-section view of a wall member of a heat transfer fluid circulation tube of the heat exchanger according to this invention.

FIG. 2 shows a front cross-section view of a wall member 20 used in the design of a heat transfer fluid circulation tube 4 of the heat exchanger 1 of FIG. 1.

Figure 4:
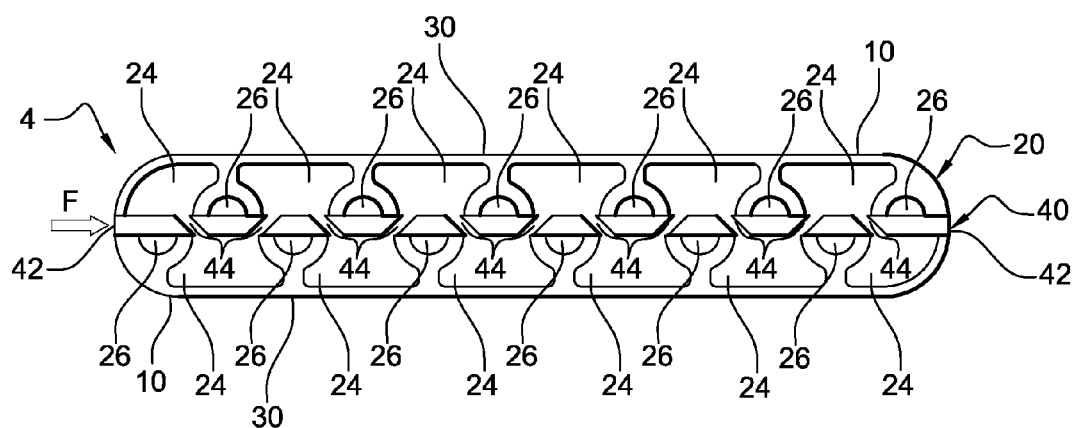
FIG. 4 is a front cross-section view of a heat transfer fluid circulation tube of the heat exchanger according to this invention.

According to this invention, a tube 4 consists of two wall members 20 between which an intermediate communication plate 40 is arranged, as shown in FIG. 4.

The wall member 20 is made of a generally rectangular sheet metal plate. The wall member 20 is defined by the external peripheral wall 10. First cavities 24 and second cavities 26 are formed in the sheet metal plate. The external peripheral wall 10 creates a separation between the external environment and the first and second cavities 24 and 26.

According to the arrangement of FIG. 2, the first cavities 24 are in contact with the external peripheral wall 10. The second cavities 26 are arranged at a distance from the external peripheral wall 10, so that they are not directly in contact with the external peripheral wall 10.

More specifically, the second cavities 26 are connected to the external peripheral wall 10 by joining walls 28. The joining walls 28 make it possible to create the distance necessary for the second cavities 26 not to be connected to the external peripheral wall 10. Advantageously, the joining walls 28 create a separation between two first contiguous cavities 24.

The second cavities 26 have a substantially semi-cylindrical shape. Thus, each second cavity 26 and the corresponding joining wall 28 are arranged in a "Y" shape.

The external peripheral wall 10 of the wall member 20 consists of a planar section 30 and two sides 32. The two sides 32 are arranged at the ends of the planar section 30 and preferably have a quarter-cylinder shape.

According to a preferred example embodiment, the wall member 20 is such that it has an alternation of first and second cavities 24 and 26 according to the thickness of the heat exchange device 1, i.e. the direction X as defined above.

In addition, the joining walls 28, according to this invention, have a lower thickness than the width of the second cavities 26. Thus, the first cavities 24 have a substantially trapezoidal shape, so that a portion of the first cavities 24 extend below the second cavities 26 in the thickness of the core, i.e. according to direction X.

Such an arrangement is particularly advantageous. Indeed, according to a first section in a first section plane arranged orthogonally to the direction X, the wall member 20 has a first section occupied only by the first cavity 24, and, according to a second section in a second section plane arranged orthogonally to the direction X and at a distance from the first section plane, the wall member 20 has a second section occupied by the first cavity 24 an the second cavity 26, and according to a third section in a third section plane arranged orthogonally to the direction X and at a distance from the first and second section planes, the wall member 20 has a third section occupied only by the second cavity 26.

In a particularly advantageous manner, the wall member 20 is produced by an extrusion process.

Figure 3:
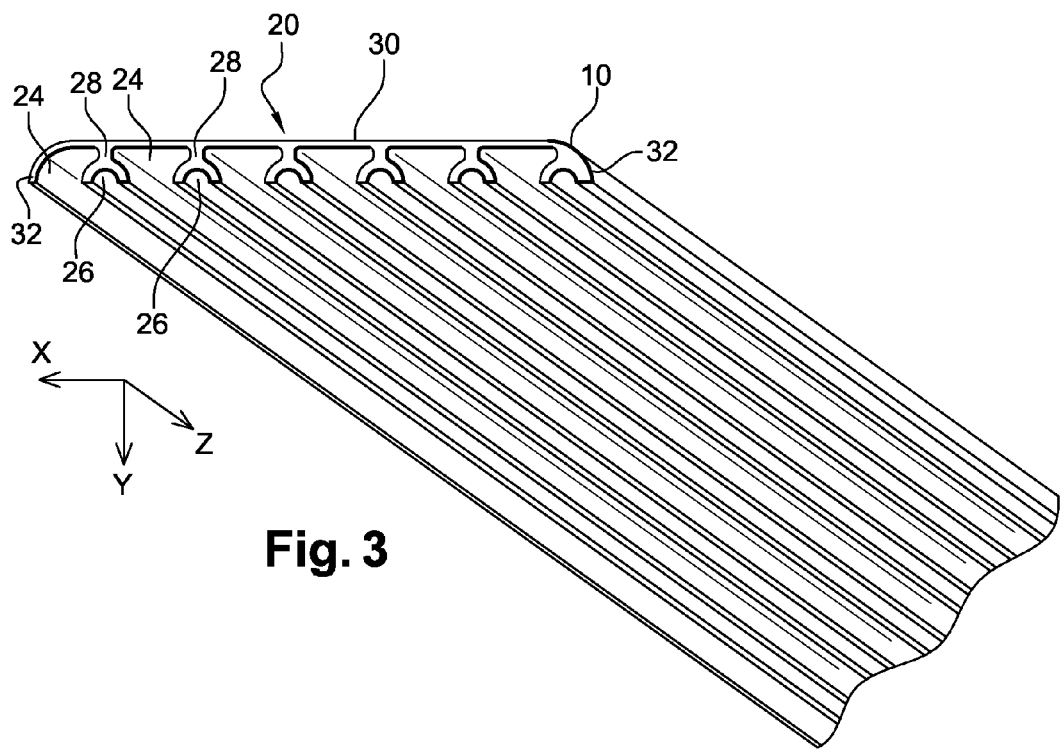
FIG. 3 is a perspective view of the wall member of the fluid circulation tube of FIG. 2.

As shown in FIG. 3, preferably, the first and second cavities 24 and 26 cover almost the entire height of the wall member 20, i.e. in direction Z, so as to provide a large heat exchange surface.

FIG. 4 shows a front cross-section view of a heat transfer fluid circulation tube 4 of the heat exchanger 1 of FIG. 1.

The tube 4 consists of two wall members 20 between which an intermediate communication plate 40 is arranged, as shown in FIG. 4.

The intermediate communication plate 40 has the same dimensions, in the direction of the height of the core, i.e. in direction Z, and the thickness of the core, i.e. direction X, as each wall member 20 forming the tube 4.

Thus, the intermediate communication plate 40 is sandwiched between the two wall members 20. According to the embodiment of FIG. 4, the intermediate communication plate 40 comprises a peripheral edge 42 cooperating with the sides 32 of the two wall member 20.

When the tube is assembled, the wall members 20 and the intermediate communication plate 40 are assembled together so as to be joined, in particular by brazing.

According to the embodiment presented, and in a particularly advantageous manner, the intermediate communication plate 40 comprises a plurality of passages enabling communication of two first cavities 24 arranged respectively in the two wall members arranged on either side of the intermediate communication plate 40.

According to the example embodiment presented, the two wall members 20 are identical and arranged with central symmetry with respect to one another. Such an arrangement enables the first cavities 24 of a wall member 20 not to be opposite the first cavities 24 of the other wall member 20. Similarly, the second cavities 26 of a wall member 20 are not opposite the second cavities of the other wall member 20. In particular, the arrangement shown in FIG. 4 is such that a first cavity 24 of a wall member 20 is opposite a second cavity 26 of the other wall member 20 while being separated from it in a sealed manner by the intermediate communication plate 40.

According to an example not shown, it is possible for the two wall members 20 forming the tube 4 to be arranged with mirror symmetry with respect to one another. According to this embodiment, the intermediate communication plate 40 becomes optional. To rigidify the tube 4 thus obtained and facilitate the brazing operations, it is nevertheless possible to insert the intermediate communication plate 40 between the two wall members 20.

According to a preferred embodiment, the first cavities 24 of the tube 4 are suitable for acting as a tank for a heat or cold storage material and the second cavities 26 of the tube 4 are suitable for enabling circulation of a heat transfer fluid.

In addition, it is possible for certain first cavities 24 not to be in communication so as to ensure at least two distinct tank zones, according to direction X, for a heat or cold storage material in the tube 4.

In a preferred embodiment, the heat transfer fluid is a coolant and the storage material is capable of storing cold. The device according to the invention is thus particularly suitable for an air conditioning system of a motor vehicle. Thus, the tubes are intended to create coolant circulation channels. The tanks are intended to create channels suitable for receiving a thermal storage material.

The heat transfer fluid can be a coolant or a heating medium. The coolant can be a supercritical fluid, in particular carbon dioxide, also known as R744, or a subcritical fluid, in particular a fluorinated compound, in particular the coolant referenced R134a. In addition, this invention can be used with other alternative fluids. The thermal storage material can be a cold storage material or a thermal storage material. Moreover, it can have the form of a solid material (for example a salt), a liquid material, a material with a phase change, or it can be a coolant liquid.

The tanks can be implemented in a so-called passive storage device, i.e. in which there is no circulation of the thermal storage material inside the tanks, or in a so-called active storage device, i.e. a device in which a circulation of the storage material is ensured inside the tanks, by means of a thermal storage material loop or circuit moved by means of a pump.

FIG. 5 diagrammatically shows, in a top view, an insert 6 and two tubes 4 of the heat exchanger 1 of FIG. 1.

In this embodiment, the first contact face 34 of the insert 6 is in contact with a tube 4 and the second contact face 36 is in contact with an adjacent tube 4. Each tube 4 has two planar sections 30. The first contact face 34 and the second contact face 36 of the insert 6 are in contact with the first cavities 24 of the tubes 4 surrounding the insert 6.

The second cavities 26 are arranged at the core of the tubes 4 in direct contact with the intermediate communication plate 40. According to the preferred arrangement, the second cavities 26 are arranged in a staggered manner in direction X.

The first cavities 24 are capable of communicating with at least one storage material collector 50. Advantageously, two collectors 50, for example with a cylindrical shape, are provided as shown in FIG. 6. The collectors 50 are arranged on either side of the core 8 and each receive one of the ends of the two cavities 26 of each of the tubes 4. The collectors 50 ensure communication of the second cavities 26 of each of the tubes 4 with one another.

Advantageously, one of the collectors 50 is equipped with a filling tube 52 enabling the first cavities 24 of the tubes 4 to be filled with a thermal storage material.

Finally, FIG. 1 shows a heat exchanger equipped with two collection tanks. It is possible to envisage a heat exchanger equipped with a single collection tank associated with the so-called U fluid circulation tubes. When a plurality of rows of tubes are provided in the core, the circulation can take place in a U-form, i.e. the circulation of the fluid in two tubes opposite one another occurs in opposite directions, or in an I-form, i.e. the circulation of the fluid in two tubes opposite one another occurs in the same direction.

Of course, the invention is not limited to the embodiments described above and provided solely as an example, and encompasses other alternatives that may be envisaged by a person skilled in the art in the context of the claims and in particular any combination of the various embodiments described above.

The invention claimed is:

1. A wall member (20) of a tube (4) for a heat exchanger, the wall member (20) comprising one-half of the tube (4), the wall member (20) being made of a sheet metal plate defining an external peripheral wall (10) and comprising at least one first cavity (24) and at least one second cavity (26), respectively formed in the sheet metal plate, wherein the at least one first cavity (24) is bound on a first side by the external peripheral wall (10), and on a second side by at least one joining wall (28), the joining wall (28) arranged in a "Y" shape extending from the external peripheral wall (10), each joining wall (28) having a cross-section arranged in a "Y" shape such that a branching portion of the "Y" shape extends away from the planar section (30) of the external peripheral wall (10) and the at least one second cavity (26) is defined within the branching portions of the "Y" shape of the corresponding joining walls (28), the at least one second cavity (26) is arranged at a distance from the external peripheral wall (10), the at least one joining wall (28) configured to connect the at least one second cavity (26) to the external peripheral wall (10) and to separate two adjacent first cavities (24);

wherein the at least one second cavity (26) has a width and the at least one joining wall (28) has a wall thickness that is less than the width of the at least one second cavity (26), such that a portion of each one of the first cavities (24) is disposed between the at least one second cavity (26) and the external peripheral wall (10).

2. The wall member (20) according to claim 1, in which each one of the first cavities (24) has a trapezoidal shape.

3. The wall member (20) according to claim 1, in which the at least one second cavity (26) has a semi-cylindrical shape.

4. The wall member (20) according to claim 1, in which a plurality of first cavities (24) and a plurality of second cavities (26) bound respectively by a plurality of joining walls (28), are arranged according to a first direction of extension along an X-axis over a width of the heat exchanger.

5. The wall member (20) according to claim 4, in which the plurality of first cavities (24) are arranged in alternation with the plurality of second cavities (26) according to the first direction of extension, such that a first of the plurality of first cavities (24) is bound on a first side by the peripheral wall (10) and further bound on two opposite sides, each respectively adjacent the first side, by a first and a second of the plurality of joining walls (28).

6. A heat exchange tube (4) for a heat exchanger (1), comprising a first wall member (20) coupled to a second wall member (20) according to claim 1 and arranged such that the at least one first cavity (24) and the at least one second cavity (26) of the first wall member (20) are oriented facing toward the at least one first cavity (24) and the at least one second cavity (26) of the second wall member (20).

7. The heat exchange tube (4) according to claim 6, in which the first and second wall members (20) are arranged one with respect to the other according to a mirror symmetry.

8. The heat exchange tube (4) according to claim 7, in which the first cavity (24) of the first wall member (20) cooperates with the first cavity (24) of the second wall member (20) to define a first fluid circulation channel.

9. The heat exchange tube (4) according to claim 7, in which the second cavity (26) of the first wall member (20) cooperates with the second cavity (26) of the second wall member (20) to define a second fluid circulation channel.

10. The heat exchange tube (4) according to claim 6, in which the first and second wall members (20) are arranged one with respect to the other according to a central symmetry.

11. The heat exchange tube (4) according to claim 6, in which an intermediate communication plate (40) is arranged between the first and second wall members (20), the intermediate communication plate (40) defining a peripheral edge (42) separating the first wall member (20) from the second wall member (20).

12. The heat exchange tube (4) according to claim 11, in which the first cavity (24) of at least one of the first wall member (20) and the second wall member (20) cooperates with the intermediate communication plate (40) in order to define a first fluid circulation channel.

13. The heat exchange tube (4) according to claim 11, in which the second cavity (26) of at least one of the first wall member (20) and the second wall member (20) cooperates with the intermediate communication plate (40) in order to define a second fluid circulation channel.

14. The heat exchange tube (4) according to claim 11, in which the intermediate communication plate (40) comprises at least one passage (44) enabling at least one of communication between at least two first cavities (24) and communication between at least two second cavities (26).

15. The heat exchange tube (4) according to claim 11, wherein the at least one first cavity (24) and the at least one second cavity (26) of the first wall member (20) and the second wall member (20) respectively comprise a plurality of first cavities (24) and a plurality of second cavities (26) arranged in alternation in a repeating series of first cavity (24) and second cavity (26), and wherein the first wall member (20) and the second wall member (20) are arranged such that the plurality of first cavities (24) of the first wall member (20) are opposite the plurality of second cavities (26) of the second wall member (20), and such that the second cavities (26) of the first wall member (20) are opposite the plurality of first cavities (24) of the second wall member (20).

16. A heat exchanger (1) comprising a plurality of tubes (4) according to claim 6.

17. The heat exchanger according to claim 16, in which a core (8) comprises a plurality of heat exchange inserts (6) in alternation with the plurality of tubes (4).

18. The heat exchanger according to claim 16, in which the first cavities (24) of the tubes (4) constitute tanks for a thermal storage material.

19. The heat exchanger according to one claim 16, in which the second cavities (26) of the tubes (4) constitute heat transfer fluid circulation channels.

20. The heat exchanger according to one claim 16, wherein the second cavities (26) of the tubes (4) constitute heat transfer fluid circulation channels for a heat transfer fluid that is a coolant and the first cavities (24) of the tubes (4) constitute tanks for a thermal storage material that is a cold storage material.

21. The wall member (20) according to claim 1, further comprising a first at least one first cavity (24) and a second at least one first cavity (24) adjacent the first at least one first cavity (24) along the peripheral wall (10) and separated by the at least one joining wall (28); the at least one second cavity (26) bound by the at least one joining wall (28) separating the first and second at least one first cavities (24), wherein at least a portion of the first at least one first cavity (24) and a portion of the second at least one first cavity (24) extend between the peripheral wall (10) and the at least one second cavity (26).

22. A wall member (20) for a heat exchanger tube (4), the wall member (20) being made of a sheet metal plate forming one-half of the tube (4), the wall member (20) comprising:
an external peripheral wall (10) comprising a planar section (30), a first side (32) disposed at a first end of the planar section and a second side (32) arranged at an end of the planar section opposite the first end, wherein the first and second sides (32) have a quarter-cylinder shape extending from the planar section;
a plurality of joining walls (28) spaced apart and extending from the planar section (30) between the first and second sides (32), each joining wall (28) having a cross-section arranged in a "Y" shape such that a branching portion of the "Y" shape extends away from the planar section (30) of the external peripheral wall (10);
wherein a plurality of first cavities (24) is defined by the planar section of the external peripheral wall (10), and the plurality of first cavities (24) are a plurality of channels formed between adjacent ones of the spaced apart plurality of joining walls (28); and
wherein a plurality of second cavities (26) is defined within the branching portions of the "Y" shape of the plurality of joining walls (28);
wherein the at least one second cavity (26) has a width and the at least one joining wall (28) has a wall thickness that is less than the width of the at least one second cavity (26), such that a portion of each one of the first cavities (24) is disposed between the at least one second cavity (26) and the external peripheral wall (10).

23. The wall member (20) according to claim 22, wherein the external peripheral wall (10) consists of the planar section (30), the first side (32) disposed at the first end of the planar section (30) and the second side (32) arranged at the end of the planar section (30) opposite the first end.

* * * * *